US008830333B2

(12) United States Patent
Amano

(10) Patent No.: US 8,830,333 B2
(45) Date of Patent: Sep. 9, 2014

(54) COMMUNICATION APPARATUS AND METHOD THEREOF

(75) Inventor: Ryosuke Amano, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 12/895,656

(22) Filed: Sep. 30, 2010

(65) Prior Publication Data

US 2011/0085048 A1 Apr. 14, 2011

(30) Foreign Application Priority Data

Oct. 9, 2009 (JP) ................................ 2009-235085

(51) Int. Cl.
*H04N 5/225* (2006.01)
*H04N 5/232* (2006.01)
*G06F 3/12* (2006.01)
*H04N 1/00* (2006.01)
*H04N 101/00* (2006.01)

(52) U.S. Cl.
CPC ....... *H04N 1/00278* (2013.01); *H04N 1/00249* (2013.01); *H04N 2101/00* (2013.01); *H04N 2201/0053* (2013.01)
USPC ...................... 348/207.2; 348/211.2; 358/1.15

(58) Field of Classification Search
CPC .................. H04N 2101/00; H04N 2201/0015; H04N 1/00278
USPC ...................... 348/207.2, 211.1, 211.2, 231.6; 358/1.1, 1.15
See application file for complete search history.

(56) References Cited

U.S. PATENT DOCUMENTS

| 8,150,449 | B2* | 4/2012 | Onozawa ................ 455/550.1 |
| 8,289,550 | B2* | 10/2012 | Shimma ..................... 358/1.15 |
| 2005/0088689 | A1 | 4/2005 | Suga et al. |
| 2005/0146616 | A1* | 7/2005 | Parulski et al. ............ 348/207.2 |
| 2006/0125867 | A1* | 6/2006 | Sakuda et al. ................. 347/19 |
| 2009/0323108 | A1* | 12/2009 | Shimma ..................... 358/1.15 |

FOREIGN PATENT DOCUMENTS

| JP | 2000-059760 A | 2/2000 | |
| JP | 2003-208367 A | 7/2003 | |
| JP | 2004-009388 A | 1/2005 | |
| JP | 2007-280211 A | 10/2007 | |
| JP | 2007280211 A | * 10/2007 | ............... G06F 1/32 |

OTHER PUBLICATIONS

Japanese Office Action issued in corresponding application No. 2009-235085 on May 14, 2013.
Japanese Office Action issued in corresponding application No. 2009-235085 on Jan. 28, 2014.

* cited by examiner

*Primary Examiner* — Nhan T Tran
(74) *Attorney, Agent, or Firm* — Carter, DeLuca, Farrell & Schmidt, LLP

(57) ABSTRACT

A communication apparatus includes a confirmation unit configured to confirm whether a processing, which is to be executed between the communication apparatus and a partner communication apparatus in communication therewith, has been selected by a user, a selection unit configured to select a processing to be executed according to a priority assigned to each of a plurality of processings, and an execution unit configured to execute the processing selected by the selection unit when the communication apparatus is again connected to the partner communication apparatus after the communication with the partner communication apparatus is disconnected, wherein the execution unit executes the selected processing when the confirmation unit confirms that there is a processing selected by the user during a period when the communication with the partner communication apparatus is disconnected and when the communication is connected again.

29 Claims, 15 Drawing Sheets

FIG. 3A

SERVICE INFORMATION OF DIGITAL CAMERA 101

| EXECUTABLE SERVICE | PRIORITY LEVEL |
|---|---|
| IMAGE PRINT (SENDING SIDE) | 10 |
| IMAGE TRANSFER (SENDING SIDE) | 5 |
| IMAGE TRANSFER (RECEIVING SIDE) | 5 |

FIG. 3B

SERVICE INFORMATION OF PRINTER 102

| EXECUTABLE SERVICE | PRIORITY LEVEL |
|---|---|
| IMAGE PRINT (RECEIVING SIDE) | 10 |
| IMAGE TRANSFER (RECEIVING SIDE) | 5 |

FIG. 3C

COOPERATIVE SERVICE OF DIGITAL CAMERA 101

| EXECUTABLE COOPERATIVE SERVICE | PRIORITY LEVEL |
|---|---|
| IMAGE PRINT (SENDING SIDE) | 20 |
| IMAGE TRANSFER (SENDING SIDE) | 10 |

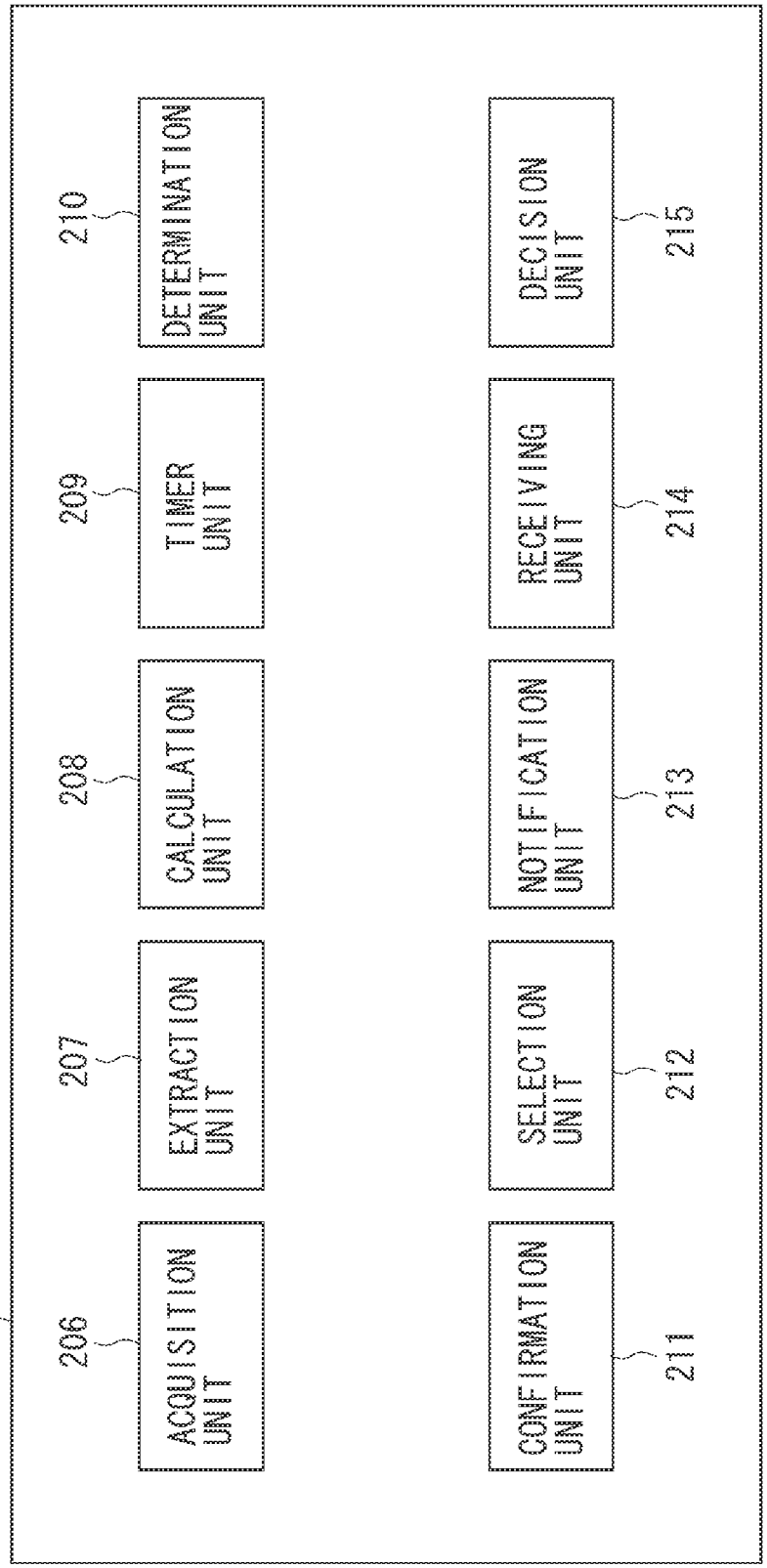

FIG. 7A

SERVICE INFORMATION OF DIGITAL CAMERA 101

| EXECUTABLE SERVICE | PRIORITY LEVEL | APPLICATION | PRIORITY LEVEL | SETTING INFORMATION | PRIORITY LEVEL |
|---|---|---|---|---|---|
| IMAGE PRINT (SENDING SIDE) | 10 | TRANSMISSION APPLICATION 1 | 5 | IMAGE SIZE = PHOTO SIZE | 10 |
| | | | | IMAGE SIZE = A4 SIZE | 5 |
| | | TRANSMISSION APPLICATION 2 | 1 | IMAGE SIZE = PHOTO SIZE | 10 |
| IMAGE TRANSFER (SENDING SIDE) | 5 | TRANSMISSION APPLICATION 3 | 10 | | |
| IMAGE TRANSFER (RECEIVING SIDE) | 5 | TRANSMISSION APPLICATION 3 | 10 | | |

FIG. 7B

SERVICE INFORMATION OF PRINTER 102

| EXECUTABLE SERVICE | PRIORITY LEVEL | APPLICATION | PRIORITY LEVEL | SETTING INFORMATION | PRIORITY LEVEL |
|---|---|---|---|---|---|
| IMAGE PRINT (RECEIVING SIDE) | 10 | RECEIVING APPLICATION 1 | 6 | IMAGE SIZE = PHOTO SIZE | 10 |
|  |  |  |  | IMAGE SIZE = A4 SIZE | 1 |
|  |  | RECEIVING APPLICATION 2 | 6 | IMAGE SIZE = PHOTO SIZE | 10 |
|  |  |  |  | IMAGE SIZE = A4 SIZE | 1 |
| IMAGE TRANSFER (RECEIVING SIDE) | 5 | RECEIVING APPLICATION 3 | 10 |  |  |

FIG. 7C

COOPERATIVE SERVICE INFORMATION OF DIGITAL CAMERA 101

| EXECUTABLE COOPERATIVE SERVICE | PRIORITY LEVEL | APPLICATION | PRIORITY LEVEL | SETTING INFORMATION | PRIORITY LEVEL |
|---|---|---|---|---|---|
| IMAGE PRINT (SENDING SIDE) | 20 | TRANSMISSION APPLICATION 1 | 11 | IMAGE SIZE = PHOTO SIZE | 20 |
|  |  | TRANSMISSION APPLICATION 2 | 7 | IMAGE SIZE = PHOTO SIZE | 20 |
| IMAGE TRANSFER (SENDING SIDE) | 10 | TRANSMISSION APPLICATION 3 | 20 |  |  |

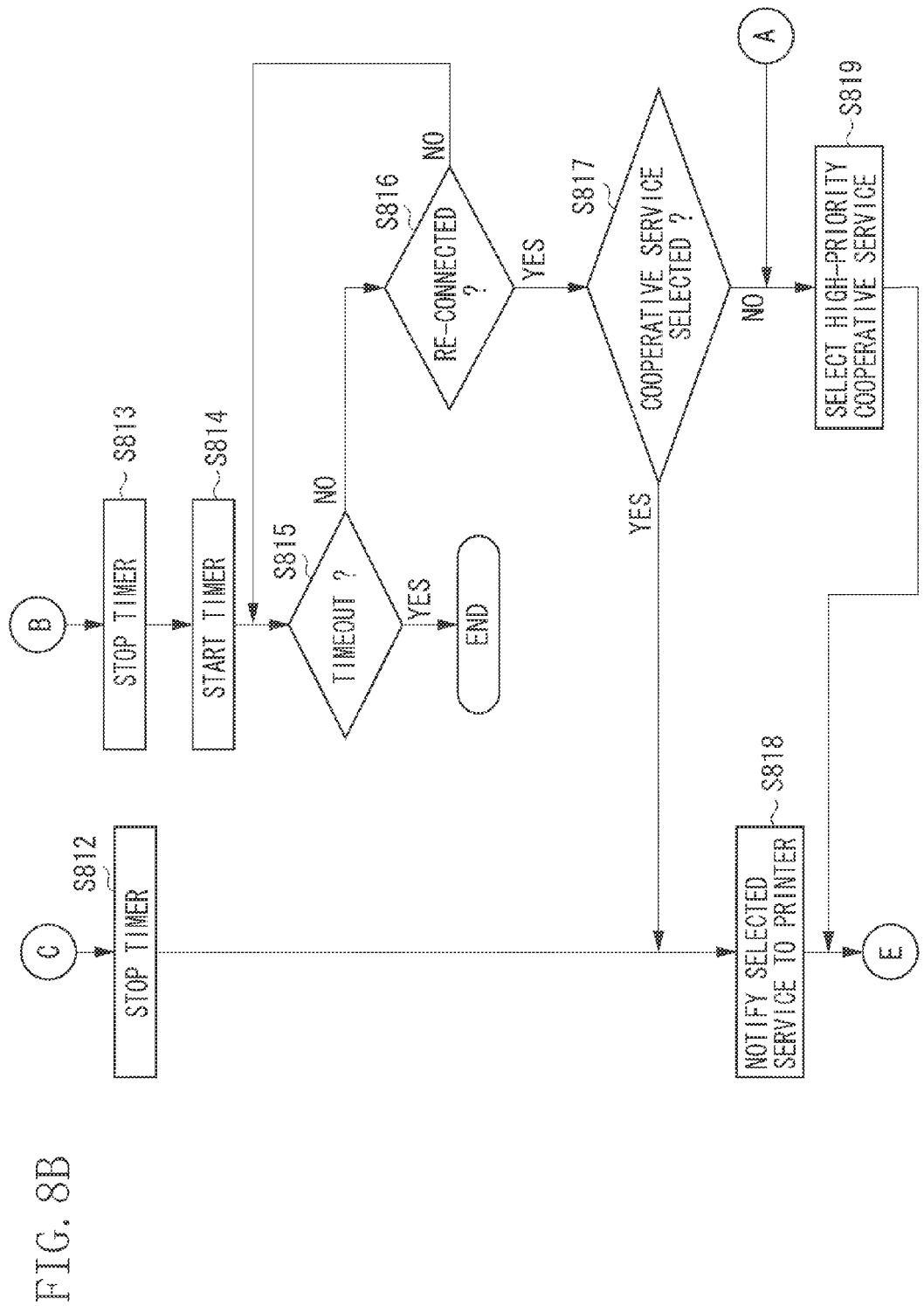

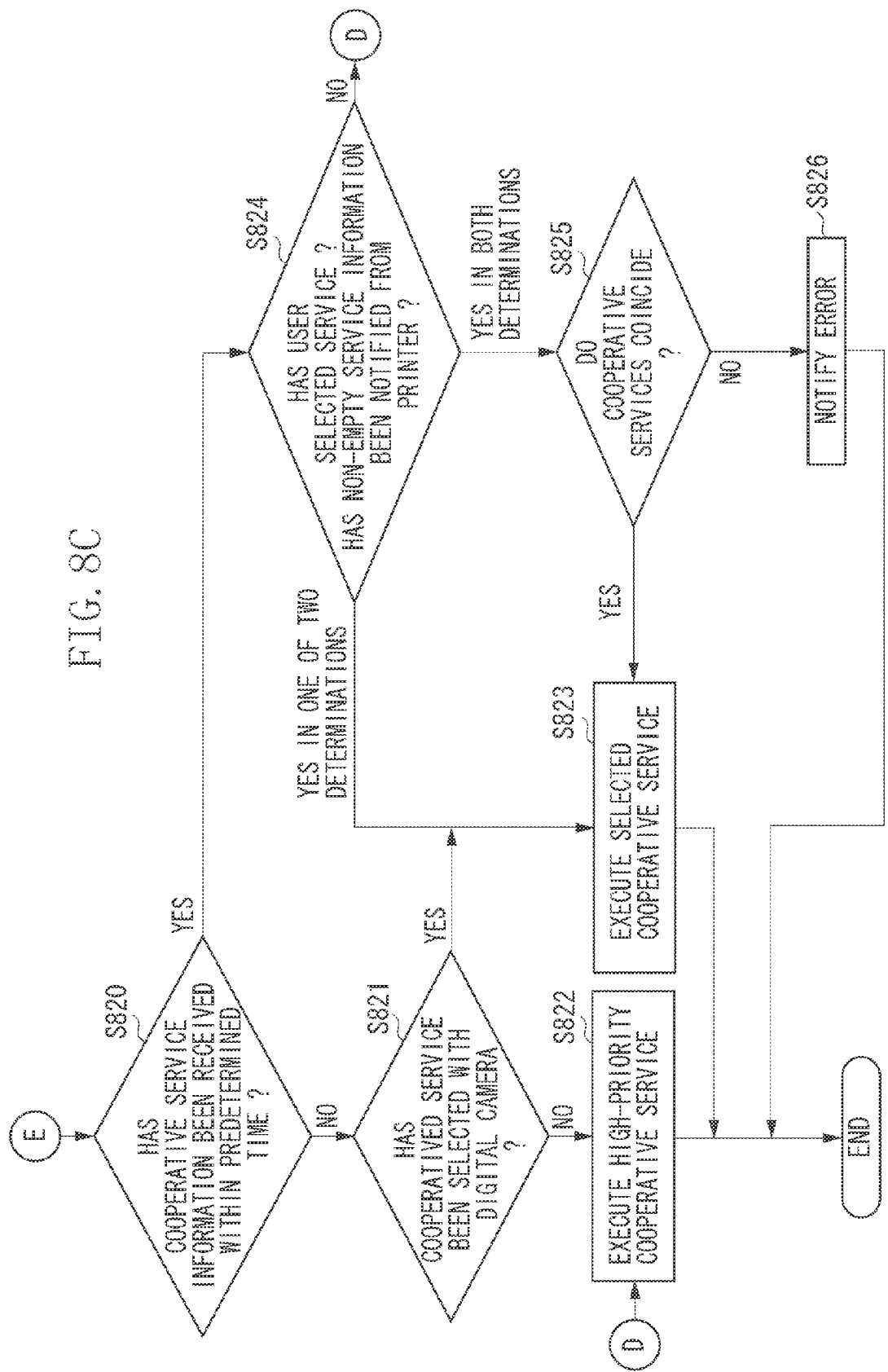

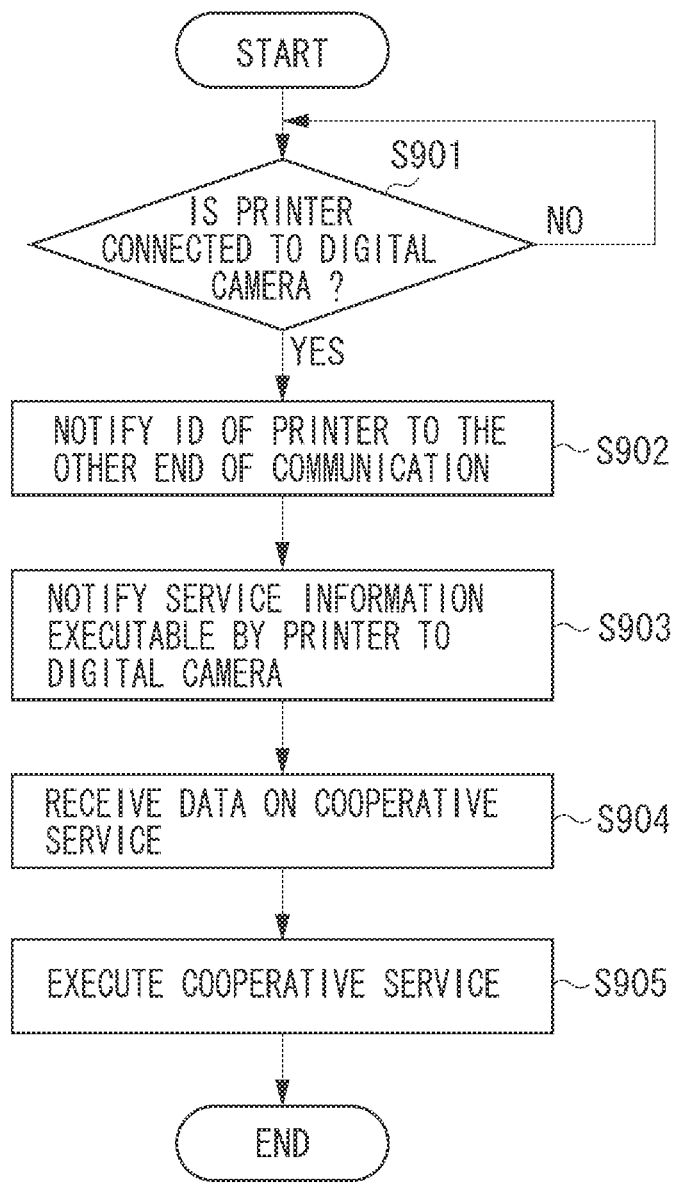

COMMUNICATION APPARATUS AND METHOD THEREOF

BACKGROUND OF THE INVENTION

1. Field of the Invention

The present invention relates to a communication apparatus, a method, and a program for executing a processing by communicating between communication apparatuses.

2. Description of the Related Art

There has been a technology for executing services by information exchange between communication apparatuses which are connected to each other. When such service is executed, settings related to the service must be performed. For example, in a case where service is executed between a digital camera and a printer, settings need to be set according to a type of service, e.g., whether to execute print service or transfer service. When print service is executed, information about paper size or picture quality needs to be set.

There is a technology to perform necessary settings to provide such a service after a user connects communication apparatuses by a wired or a wireless LAN (refer to Japanese Patent Application Laid-Open No. 2004-9388). On the other hand, there is a technology in which an apparatus automatically sets information related to service according to a predetermined order of priorities (refer to Japanese Patent Application Laid-Open No. 2003-208367).

There is another type of technology, a wireless technology that enables communication, i.e., exchange of data between the apparatuses existing within a distance of about several centimeters or less. To cite examples of this technology, there are contactless IC card wireless communication and near field communication (NFC), which both utilize electromagnetic induction, and TransferJet®, which makes use of induced electric field. In this category of proximity wireless communication, the two cooperating apparatuses are connected as they come closer to each other and the communication is disconnected as they separate from each other.

Normally, in services that are executed by the cooperation between apparatuses, it is supposed that the service will be completed while the cooperating apparatuses are in connection. Accordingly, if the communication is disconnected in the middle of communication, the processing is often terminated.

However, in proximity wireless communication, since the communication distance is short, the communication tends to be cut off easily. For this reason, even if the cooperating apparatuses are connected by near field communication and service is provided by cooperation between the communication apparatuses, it is highly likely that the communication is disconnected during the communication.

SUMMARY OF THE INVENTION

The present invention is directed to an improvement of the convenience for a user when the user causes processing to be executed between a communication apparatus on the user's side and a communication apparatus in communication therewith by utilizing the type of communication system that enables a user to easily connect and disconnect the two cooperating communication apparatuses.

According to an aspect of the present invention, a communication apparatus includes a confirmation unit configured to confirm whether a processing, which is to be executed between the communication apparatus and a partner communication apparatus in communication therewith, has been selected by a user, a determination unit configured to determine a processing to be executed according to a priority assigned to each of a plurality of processings, and an execution unit configured to execute the processing determined by the determination unit when the communication apparatus is again connected to the partner communication apparatus after the communication with the partner communication apparatus is disconnected, wherein the execution unit executes the selected processing, which has been selected by the user, when the confirmation unit confirms that there is a processing selected by the user during a period when the communication with the partner communication apparatus is disconnected and when the communication is connected again.

According to the present invention, convenience for a user is improved when processing is performed between one communication apparatus and the other communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A, 3B, and 3C illustrate service information.

FIG. 4 is a function block diagram of the digital camera.

FIGS. 7A, 7B, and 7C illustrate service information.

FIGS. 8A, 8B and 8C is a flowchart illustrating operations executed by the digital camera.

FIG. 9 is a flowchart illustrating operations executed by a printer.

DESCRIPTION OF THE EMBODIMENTS

Various exemplary embodiments, features, and aspects of the invention will be described in detail below with reference to the drawings.

Figure 1:
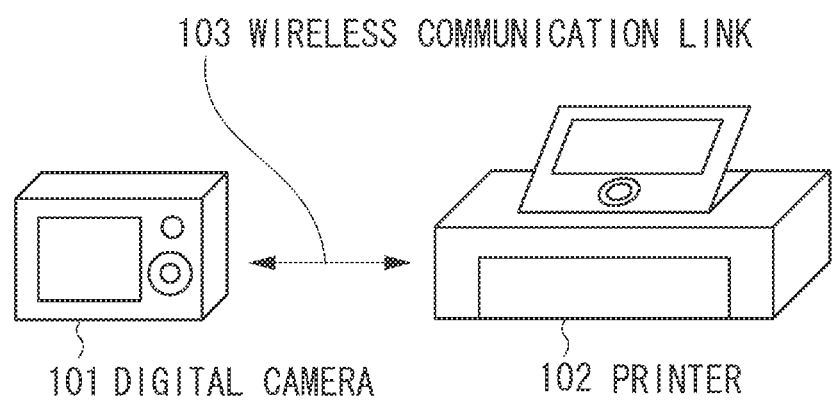
FIG. 1 is a diagram illustrating a system configuration.

FIG. 1 is a system configuration diagram according to a first exemplary embodiment of the present invention. As illustrated in FIG. 1, a digital camera 101 and a printer 102 are connected by a wireless communication link 103. In this exemplary embodiment, when a user brings the digital camera 101 and the printer 102 close to each other, pier-to-pier communication can be executed via a wireless communication link 103.

Wireless communication used in this exemplary embodiment is provided by TransferJet (trademark) which utilizes induced electric field. However, contactless IC card wireless communication and near field communication (NFC), both of which uses electromagnetic induction, may be used. In these types of wireless communication, communication can be executed when the communication apparatuses are positioned within a distance of several centimeters.

In this exemplary embodiment, communication is executed via radio waves, but may be carried out via cable. For example, communication can be executed by connecting the digital camera 101 to a cradle mounted on the printer 102 or connecting the printer 102 and the digital camera 101 via a USB cable.

Figure 2:
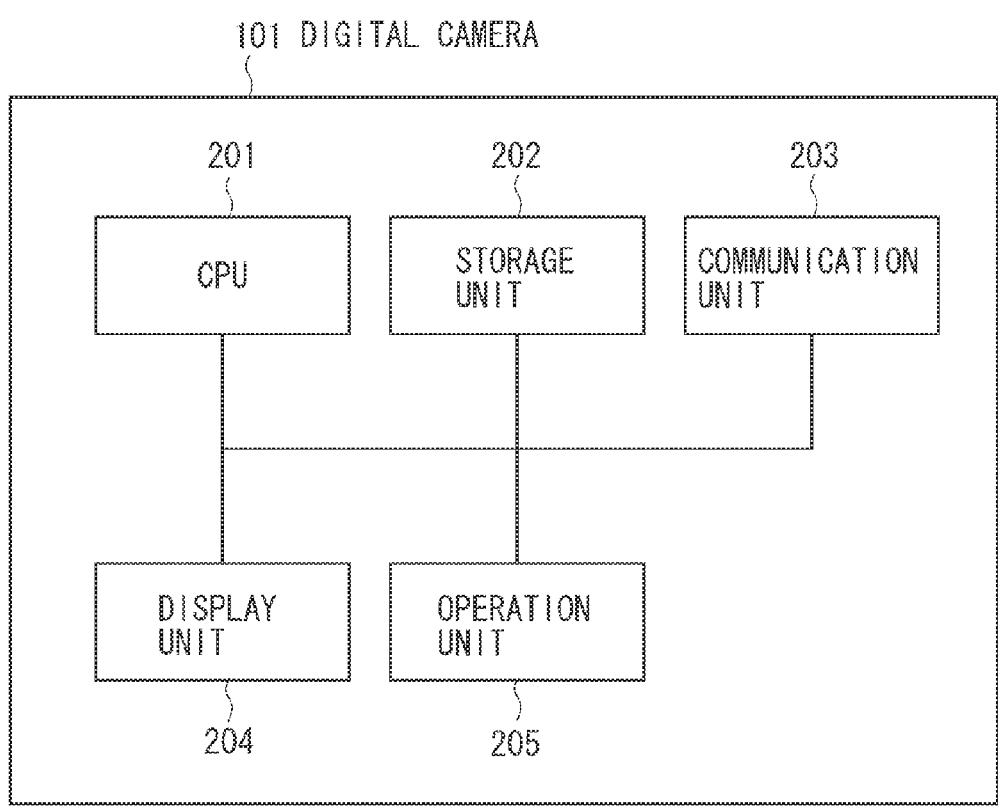
FIG. 2 is a block diagram illustrating a hardware configuration of a digital camera.

FIG. 2 is a hardware configuration diagram of the digital camera 101. FIG. 2 illustrates only a hardware configuration used in the present exemplary embodiment, and other items of hardware are omitted. The printer 102 also includes a similar hardware configuration.

A CPU 201 controls the digital camera 101. A storage unit 202, which includes a ROM and a RAM, stores a program to be executed to implement flowcharts to be described later.

The storage unit 202 stores data such as still and moving image files. The storage unit 202 also stores an application to execute a function that can be provided by the digital camera 101 (hereafter referred to as service) as well as information about the function (hereafter referred to as service information). The storage unit 202 stores service information illustrated in FIG. 3A.

Service information is written in an extensible markup language (XML language), and includes services and priority levels corresponding to the respective services. The priority levels are predetermined values assigned to services. The higher the number, the higher the priority will be. Therefore, service at a higher priority level takes precedence in execution over services at lower priority levels. The priority setting may be determined so that the priority is higher for services used at higher frequencies. Service information in FIGS. 3B and 3C will be described later.

A communication unit 203 performs communication via the wireless communication link 103. A display 204 displays various items of information. An operation unit 205 is used by a user to operate the digital camera 101. The user can selects cooperative service by pressing a button on the operation unit 205.

Cooperative service is service that is executed through communication between one communication apparatus and the other communication apparatus. For example, when the at the other communication apparatus has an "Image Print service (receiving side)", an "Image Print service (sending side)" on the one side of communication is cooperative service.

FIG. 4 is a function block diagram of the digital camera 101. The function blocks are realized by the CPU 201 by reading and executing a program stored in the storage unit 202.

The function blocks may be realized by using hardware using application specific integrated circuits (ASICs). A plurality of the function blocks may be integrated into one function block, and one function block may be divided into a plurality of function blocks to implement a desired function.

An acquisition unit 206 acquires service information of the other communication apparatus. Like in service information of the digital camera 101, service information of the other communication apparatus includes executable service information and priority levels assigned to each service. An extraction unit 207 extracts cooperative service out of services that can be provided by the digital camera 101 according to service information of the other communication. apparatus A calculation unit calculates priority levels to be assigned to cooperative services. A timer unit 209 counts time. A determination unit 210 determines whether communication with the same apparatus as before has been connected again.

A confirmation unit 211 confirms whether a user has selected cooperative service via the operation unit 205. A selection unit 212 selects cooperative service at a highest priority level out of cooperative services. The other units 213 to 215 will be described in a second exemplary embodiment of the present invention.

Figure 5A:
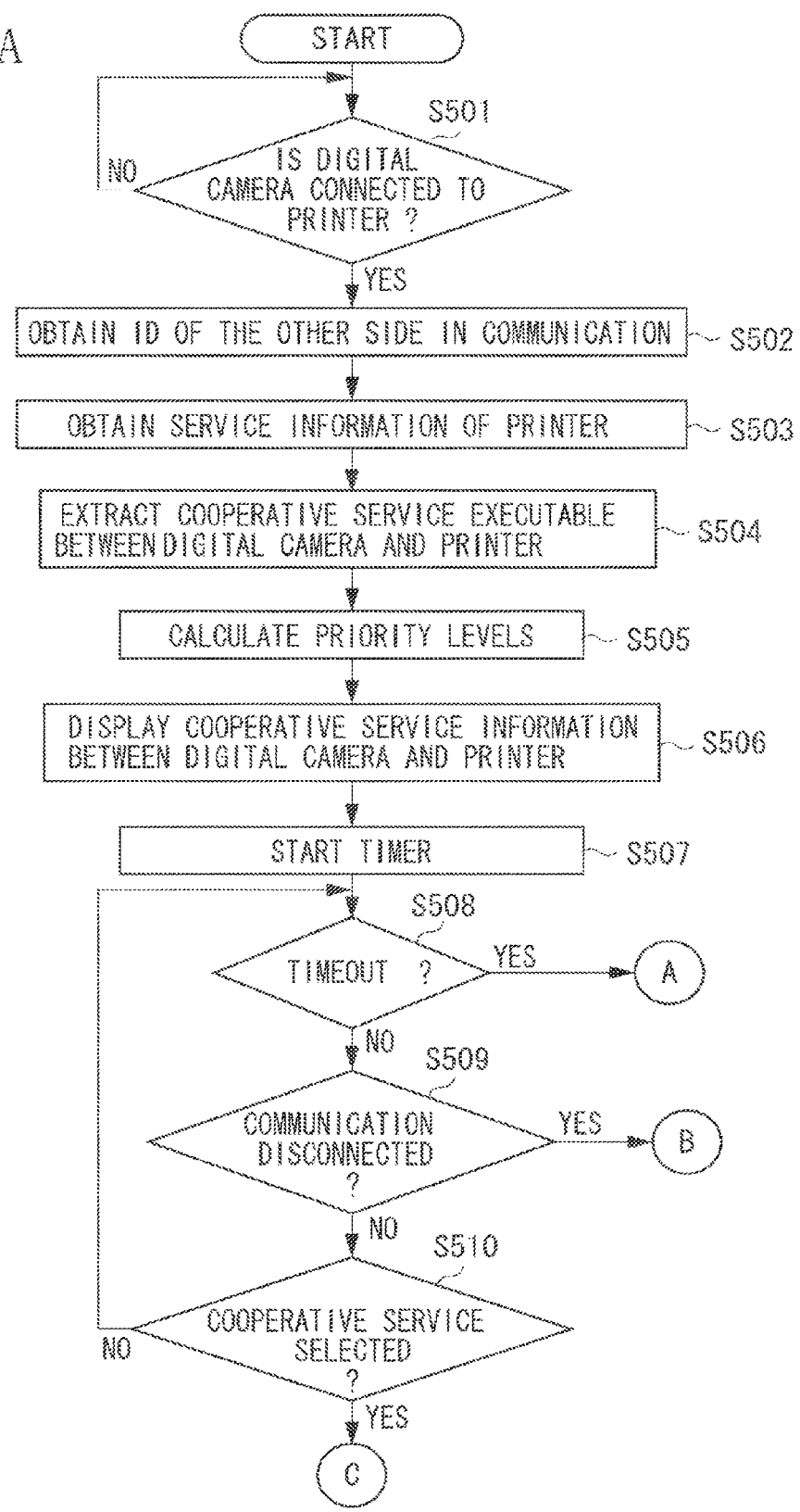
FIGS. 5A, 5B, and 5C are flowcharts illustrating operations executed by the digital camera.

FIG. 5A is a flowchart illustrating the operations, which are performed by the CPU 201 by reading and executing a program stored in the storage unit 202. FIG. 9 is a flowchart illustrating the operations, which are performed by a CPU of the printer 102 by reading and executing a program stored in a storage unit of the printer 102.

Figure 5B:
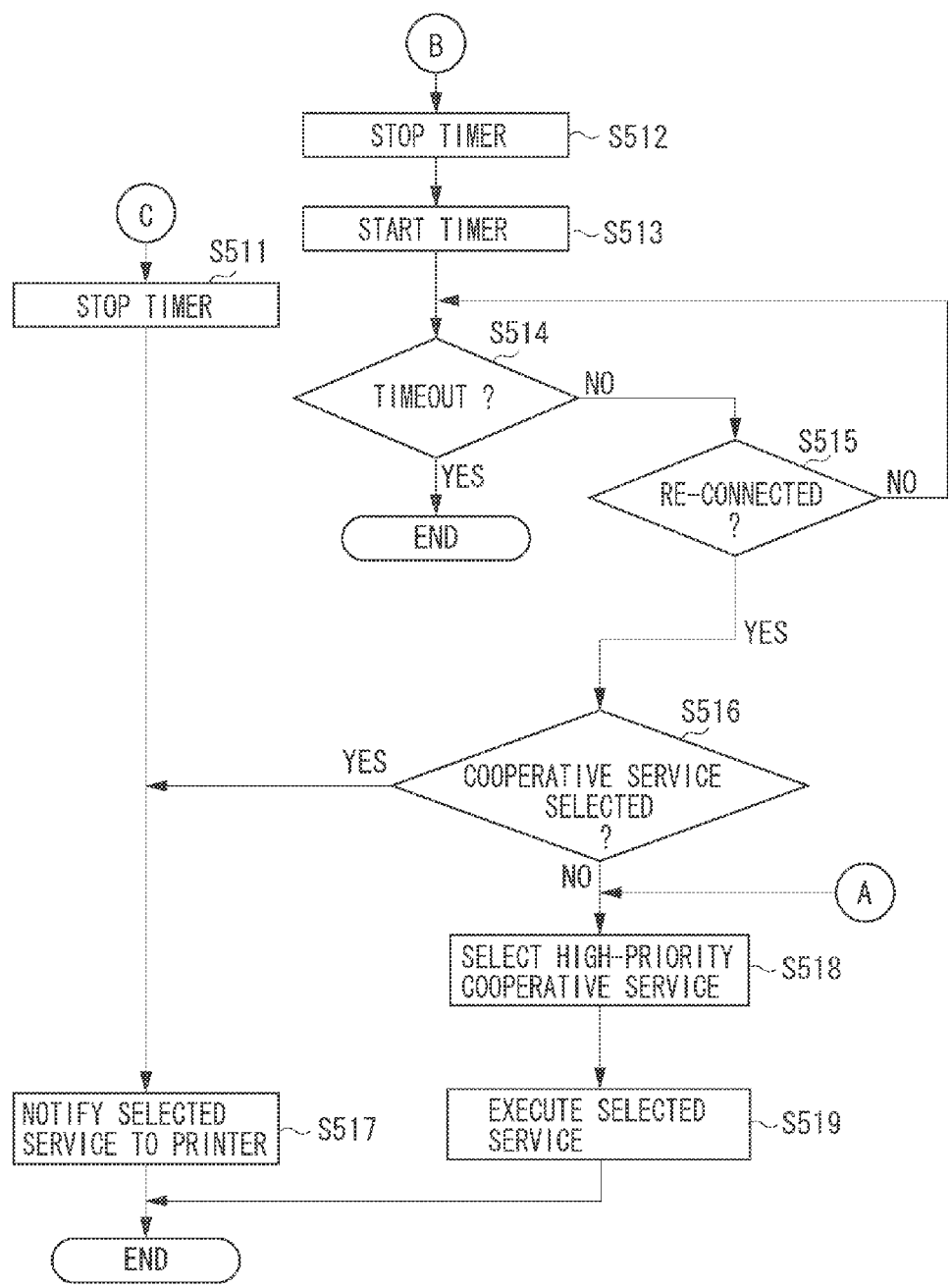
Figure 5C:
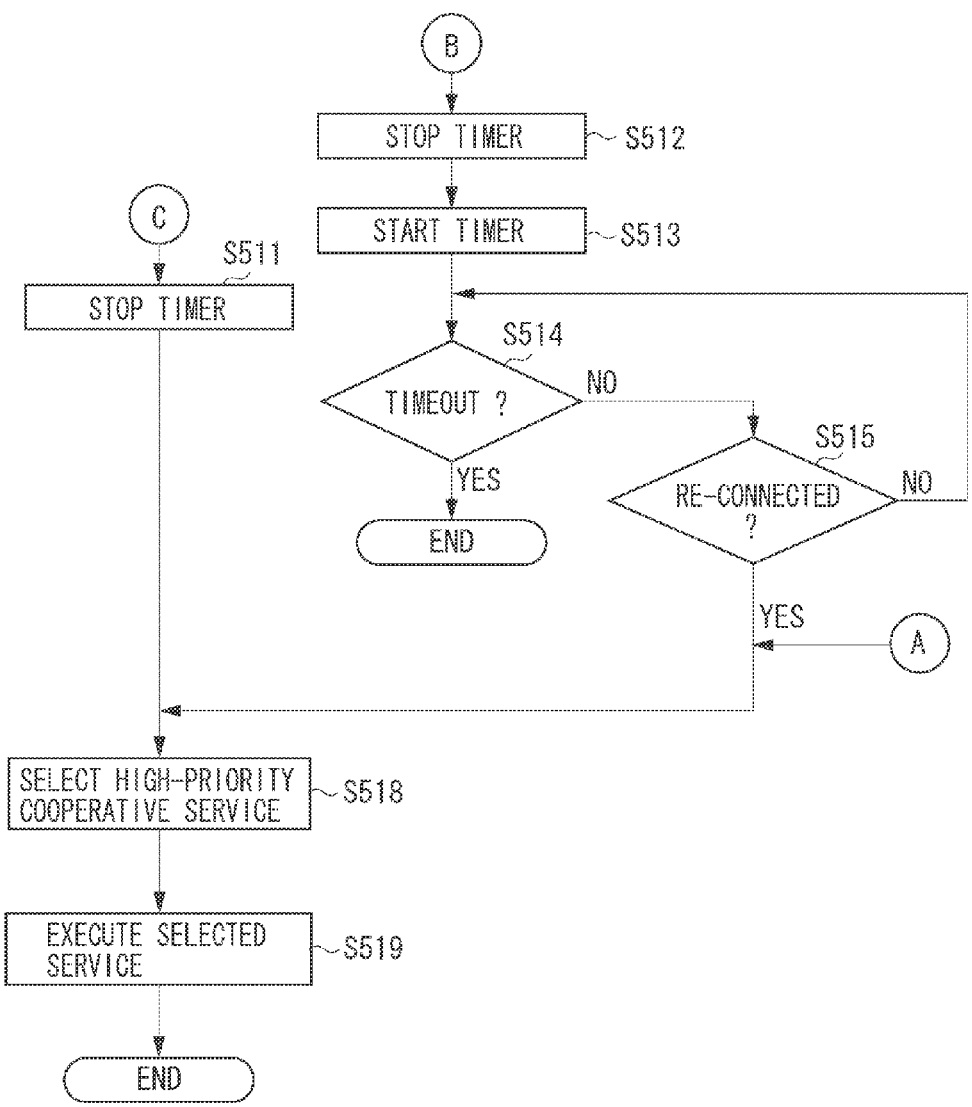

In the following, description will be made with attention focused on the digital camera 101, so that the digital camera 101 is defined as one's own apparatus and the printer 102 is defined as a partner apparatus on the other side of communication. Even if the printer 102 is called one's own apparatus and the printer 102 is called the partner apparatus, the operations to be performed remain unchanged. FIG. 5B will be described later.

As a default setting, in the digital camera 101, an image has been selected by a user. And, the digital camera 101 and the printer 102 are located at a sufficiently remote distance apart, so that wireless communication cannot be performed via a wireless communication link 103. Under this condition, the user brings the digital camera 101 close to the printer 102.

In step S501, the communication unit 203 of the digital camera 101 detects whether communication is established (connected) via a wireless communication link 103. Here, the communication unit 203 detects that a connection is established to the printer 102.

When the connection is detected (YES in step S501), the processing proceeds to Step 502, the communication unit 203 obtains an identifier (ID) to identify the printer 102, and the storage unit 202 stores the obtained ID.

In step S503, the acquisition unit 206 acquires service information from the printer 102 via the communication unit 203, and the storage unit 202 stores acquired service information. The printer 102 has service information illustrated in FIG. 3B, and the acquisition unit 206 acquires the service information. The service information held by the printer 102 is stored in a storage unit (not illustrated) in the printer 102.

On the other hand, referring to FIG. 9, in step S901, the communication unit of the printer 102 detects that the printer 102 is connected to the digital camera 101 (YES in step S901), and, in step S902, transmits the ID of the printer 102 to the digital camera 101. The ID of the printer 102 is stored in the storage unit (not illustrated) in the printer 102.

In step S903, the CPU of the printer 102 transmits, via its communication unit, service information held by the printer 102 to the digital camera 101.

Referring to FIG. 5A, in step S504, the extraction unit 207 extracts a cooperative service executable between the digital camera 101 and the printer 102 from among services executable by the digital camera 101 according to service information from the printer obtained in step S503. In addition, the storage unit 202 stores extracted cooperative service.

The storage unit 202 stores services executable by the digital camera 101, such as "Image Print (sending side)", "Image Transfer (sending side)", and "Image Transfer (receiving side)". On the other hand, the storage unit 202 also stores services executable by the printer 102, such as "Image Print (receiving side)" and "Image Transfer (receiving side)".

Therefore, as combinations of executable services, there are "Image Print (sending side) by the digital camera 101 and Image Print (receiving side) by the printer 102" and "Image Transfer (sending side) by the digital camera 101 and Image Transfer (receiving side) by the printer 102".

As the cooperative services executable by the digital camera 101 jointly with the printer 102, the extraction unit 207 extracts "Image Print (sending side)" and "Image Transfer (sending side)" from among services executable by the digital camera 101 stored in the storage unit 202.

In step S505, the calculation unit 208 calculates priority levels assigned to respective cooperative services by summing the priority level assigned to a service in the digital camera 101 and the priority level assigned to a service in the printer 102. Furthermore, the storage unit 202 stores calculated priority levels.

The calculation unit 208 may calculate the priority level assigned to cooperative service by multiplying the priority level assigned to a service in the digital camera 101 by the priority level assigned to a service in the printer 102.

If priority levels have not been assigned to services in the printer 102, the calculation unit 208 may output priority levels assigned in the digital camera 101 as priority levels of cooperative services. Also, the calculation unit 208 may calculate priority levels according to types of data selected in the digital camera 101.

For example, in a case where an image is selected, the priority level of "Image Print (sending side)" is made higher than the priority level of "Image Transfer (sending side). In a case where a moving image is selected, the priority level of "Image Transfer (sending side)" is made higher than the priority level of "Image Print (sending side)".

As described above, as the priority level is calculated according to the type of data, operations are executed according to an order of the priority set according to the type of data. Accordingly, the convenience for users can be increased.

The cooperative service information illustrated in FIG. 3C is generated according to steps S504 and S505. If there is no cooperative service executable between the communication apparatuses, an error is notified to the user, and the processing is terminated.

As described above, before data is transferred, the user is notified that there is no executable cooperative service, which improves the convenience for the user. Moreover, in this case, the communication apparatus need not transfer data, which reduces the processing and communication load on the apparatus.

If there is only one type of cooperative service executable between the cooperating communication apparatuses, the processing advances to step S518, which will be described in detail below, and the cooperative service may be executed without the user selecting a cooperative service or waiting until the timer times out. Since it becomes easier for the user to use cooperative services, the convenience for the user can be improved.

When the display unit 204 is in a predetermined display state, the processing may proceed to step S518 without waiting for the selection of the cooperative service and the time-out of the timer, which will be described below.

For example, if a moving image file has been selected, the processing proceeds to step S518 without waiting for the selection of the cooperative service and the time-out of the timer, and the digital camera 101 executes "Image Transfer (sending side)". By this arrangement, cooperative service can be executed instantly according to a display status, which improves the convenience for the user.

In step S506, the display unit 204 displays cooperative services executable between the digital camera 101 and the printer 102. While viewing the display, the user can select a cooperative service via the operation unit 205.

Figure 6:
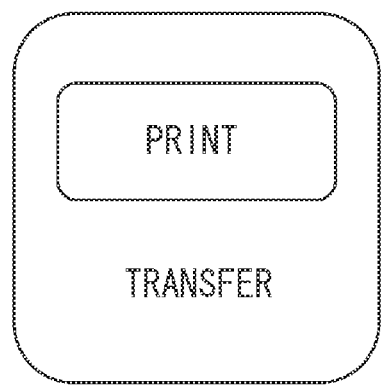
FIG. 6 is a display screen displayed on the digital camera.

As illustrated in FIG. 6, the display unit 204 displays cooperative services in an ascending order of priority, i.e., higher priority a service has, an upper position the service is displayed. Therefore, the user can easily select recommended cooperative services. As described above, the cooperative services are generated and presented to the user according to the information about services executable between one's own apparatus and the partner apparatus.

Thus, the user can easily know the services that can be provided by cooperation between one's own apparatus and the other partner apparatus in corporation with each other. Furthermore, the user can easily select a service desired to be executed.

The display unit 204 continues to display information until service is selected by the user (YES in step S510), or until a predetermined time elapses (YES in step S508 or S514) or after the connection to the printer 102 is cut off until a connection is established again (YES in step S515).

While the information display is continued, the operation unit 205 accepts selection of service by the user. This enables the user to select a service regardless of a connection state between the digital camera 101 and the printer 102 (even if the connection is cut off, for example).

In step S507, the timer unit 209 starts the timer, to determine whether the user selects a cooperative service within a predetermined time period. In step S508, the timer unit 209 confirms whether timer started in step S507 has timed out. When the timer has timed out (YES in step S508), the processing proceeds to step S518. If the timer has not timed out (NO in step S508), the processing proceeds to step S509.

In step S509, the communication unit 203 determines whether the communication with the printer 102 is disconnected (or connected). If the communication is not disconnected (connected) (NO in step S509), the processing proceeds to step S510. In step S510, the confirmation unit 211 confirms whether a cooperative service has been selected by the user via the operation unit 205.

If a cooperative service has been selected by the user (YES in step S510), the processing proceeds to step S511. If a cooperative service has not been selected (NO in step S510), the processing proceeds to step S508. In step S511, the timer unit 209 stops the timer that has been started in step S507, and the processing proceeds to step S517.

On the other hand, in step S509, if communication with the printer 102 is disconnected (discontinued) (YES in step S509), the processing proceeds to step S512. In step S512, the timer unit 209 stops the timer that has been started in step S507.

In step S513, the timer unit 209 starts a timer to measure time elapsed since the communication has been disconnected. In step S514, the timer unit 209 confirms whether the timer started in step S513 has timed out.

When the timer has timed out (YES in step S514), the processing is completed. If the timer has not timed out (NO in step S514), the processing proceeds to step S515. In other words, when the digital camera 101 has been disconnected from the printer 102 for more than a predetermined time period, the processing is terminated. With the above configuration, processing load on the digital camera 101 can be reduced, and power savings can be achieved.

In step S515, the determination unit 210 determines whether the digital camera 101 has been again connected to the same printer 102. Whether the same printer has been connected again is determined by collating the ID obtained in step S502 with the ID of the communication apparatus connected after the printer 102 has been cut off.

If the same printer 102 has been connected to the digital camera 101 again (YES in step S515), the processing proceeds to step S516. On the other hand, if the same printer 102 is not connected to the digital camera 101 again (NO in step S515), and the processing proceeds to step S514. If another apparatus different from the printer 102 has been connected, the processing proceeds to step S501. This, processing to the new apparatus can be started.

In step S516, the confirmation unit 211 confirms whether a cooperative service has been selected by the user via the operation unit 205 while the communication is disconnected. If a cooperative service has been selected by the user via the operation unit 205 (YES in step S516), the processing proceeds to step S517.

In step S517, the CPU 201 transmits data to the printer 102 via the communication unit 203 to execute the cooperative service selected by the user. Image data of images selected previously is transmitted to the printer 102. Before the cooperative service is executed, the notification unit 203 notifies the cooperative service to be executed to the printer 102.

In step S904, in the printer 102, the communication unit receives data transmitted from the digital camera 101 in step S517. In step 905, the CPU executes cooperative service according to received data.

On the other hand, if a cooperative service has not been selected (NO in step 516), the processing proceeds to step S518. In step S518, the selection unit 212 selects a cooperative service with the highest priority level from among executable cooperative services according to priority levels calculated in step S505. "Image Print (sending side)" is selected from "Image Print (sending side)" and "Image Transfer (sending side)".

In step S519, the CPU 201 transmits data to the printer 102 via the communication unit 203 to execute the cooperative service selected in step S518.

In step S904, in the printer 102, the communication unit receives data sent from the digital camera 101. In step S905 (in step S519), the CPU executes the cooperative service based on received data.

As described above, the digital camera 101 can recognize services that the printer 102 can execute. The digital camera 101 recognizes such service by acquiring information about the service that the printer 102 can execute.

The way by which the digital camera 101 recognizes executable service is not limited to this method. For example, the digital camera 101 may recognize the printer 102 as a partner communication apparatus, and also may recognize that the service that the partner apparatus can execute is "Image Print (receiving side)". Thus, even when the other partner apparatus (printer) can not notify executable services, the digital camera can recognize the services that can be executed by the printer. Thus, the convenience for the user can be increased.

If the user selects a cooperative service while the digital camera 101 and the printer 102 is connected, the cooperative service can be executed instantly, which contributes to further enhancement of the convenience for the user.

Even when the user has not selected a cooperative service, if the digital camera 101 and the printer 102 are connected again within a predetermined time period, a cooperative service can be executed, which is selected according to priority levels assigned to individual cooperative services. Also in this case, the convenience for the user can be further increased.

When a cooperative service is selected by the user, the selected cooperative service may be assigned a high priority level (1000, for example), and the selected cooperative service may be executed according to the assigned priority level. When the selected cooperative service is raised to a higher priority level, the CPU 201 may execute steps S511 to S519 in FIG. 5B instead of steps S511 to S519 in FIG. 5A.

Since steps S501 to S510 of FIG. 5B are similar to steps S511 to S519 in FIG. 5A, their descriptions will not be repeated here. By raising the priority level of the selected cooperative service, the flowchart can be simplified.

In the first exemplary embodiment, in step S518, a cooperative service is selected according to the priority level. However, the way of selection is not limited to this, and a predetermined cooperative service may be selected.

In the first exemplary embodiment, the digital camera 101 determines the cooperative service. However, when both cooperating apparatuses can determine the cooperative service, after they are connected, their IDs may be exchanged, and the apparatus with a larger ID may determine the cooperative service.

The communication apparatus which makes a request of connection may determine the cooperative service. Alternatively, after the two apparatuses are connected, they may exchange apparatus information, and the apparatus with more remaining amount of battery charge or the apparatus using commercial power supply may determine cooperative service. The apparatus that determines cooperative service may be selected randomly.

In the first exemplary embodiment, after the digital camera 101 and the printer 102 are connected, the user selects the cooperative service. However, it is not limited to this. Even when the display unit 204 is in the state before step S506 (including the state before the printer 102 is connected to the digital camera 101), the display unit 204 may display services that the digital camera can execute, and the user may be allowed to select a service via the operation unit 205.

If the user has selected a cooperative service that can be executed in cooperation with the printer 102, steps S505 to S511 are skipped, and after step S504 is executed, the processing may proceed to step S517.

If the user has selected cooperative service that cannot be executed, the display unit 204 displays an error, and then the processing is terminated. What is called executable cooperative services is services extracted in step S504.

In the first exemplary embodiment, a case where a cooperative service is determined between the digital camera 101 and the printer 102 is described. In addition to the combination of these apparatuses, the present exemplary embodiment can be applied to various combinations of devices, such as a camera (a video camera or a still camera) and a cell phone, a cell phone and a cell phone, a PC (including a notebook PC) and a printer, a PC and a camera, a camera and a TV set, and so on.

In the first exemplary embodiment described above, the cooperative service is determined by the digital camera 101. In a second exemplary embodiment, the cooperative service can be determined either by the digital camera 101 or the printer 102.

The system configuration in the second exemplary embodiment is similar to that of the first exemplary embodiment, the description will not be repeated. The hardware configuration of the digital camera 101 and the printer 102 in the second exemplary embodiment is similar to that in the first exemplary embodiment, the description will not be repeated.

FIG. 2 is a diagram illustrating function blocks of the digital camera 101. The same structural blocks as in the first exemplary embodiment are designated by the same symbols and their descriptions are not repeated. The structural blocks in FIG. 2 are realized by the CPU 201 by executing a program stored in the storage unit 202. The printer 102 also includes the similar function blocks.

In the second exemplary embodiment, the storage unit 202 stores service information of the digital camera 101 as illustrated in FIG. 7A. Service information according to the second exemplary embodiment includes priority levels corresponding to executable services and individual services, applications to execute services and their priority levels, and setting information used for applications and their priority levels.

A transmission application 1 corresponds to PictBridge®, and can execute print service by communicating with reception application 1 corresponding to PictBridge.

In the transmission application 1, the image size includes the photo size and the A4 size. The storage unit 202 stores setting information related to those sizes. The storage unit may store setting information, such as image quality, and color and monochrome.

A Transmission application 2 complying with DPOF®, and can execute print service by communicating with reception application 2, which complies with DPOF. In the transmission application 2, the image size includes photo size only.

Transmission application 3 complies with Object exchange protocol (OBEX), and can execute transfer service by communicating with receiving application 3, which complies with OBEX.

A notification unit 213 notifies service information held by the digital camera 101 to the communication partner apparatus via the communication unit 203. The notification unit 213 further notifies service information selected on the digital camera 101 to the communication partner apparatus via the communication unit 203.

A receiving unit 214 receives information about the cooperative service selected by the printer 102. A decision unit 215 decides whether the cooperative service selected by the digital camera 101 coincides with the cooperative service selected by the printer 102.

Figure 8A:
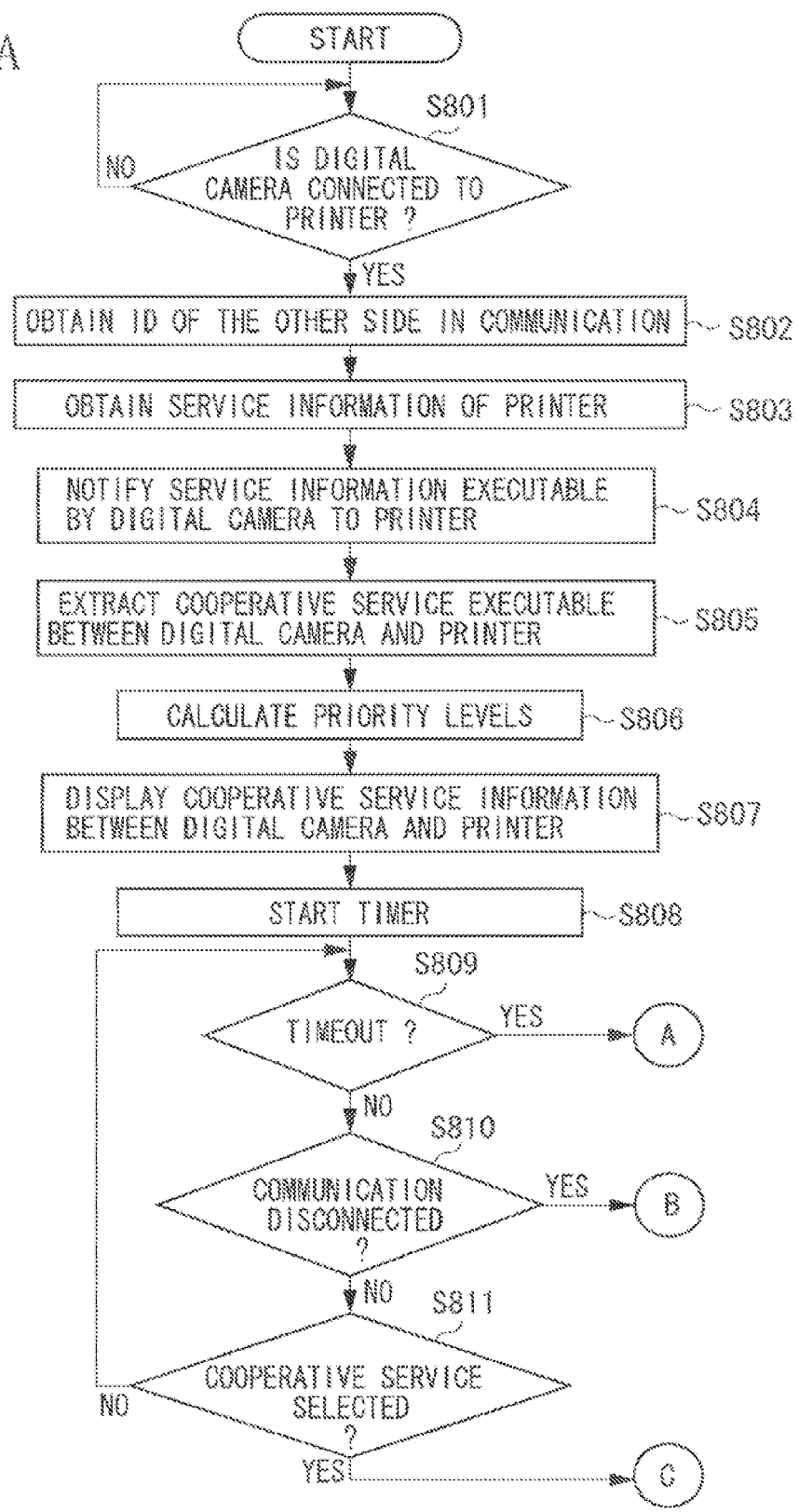

FIGS. 8A-8C (collectively referred to as FIG. 8) are flowcharts illustrating operations, which are performed by the CPU 201 reading and executing a program stored in the storage unit 202. In the printer 102, the CPU executes the operations of a similar flowchart. In the present exemplary embodiment, a case where the digital camera 101 executes the operations in the flowchart will be described.

As a default setting, in the digital camera 101, an image has been selected by a user. And, the digital camera 101 and the printer 102 are located at a sufficiently remote distance apart, so that wireless communication cannot be performed via the wireless communication link 103. Under this condition, the user brings the digital camera 101 close to the printer 102.

In step S801, the communication unit 203 detects whether communication via the wireless communication link 103 has been established (connected). If a connection is detected (YES in step S801), the processing proceeds to step S802, and the communication unit 203 acquires the ID of the printer 102, and the storage unit 202 stores the ID.

The ID of the printer 102 is stored in the storage unit of the printer 102. The processing proceeds to step S803, and the acquisition unit 206 acquires service information of the printer 102 via the communication unit 203, and stores the service information in the storage unit 202.

The acquisition unit 206 acquires from the printer 102 service information illustrated in FIG. 7B stored in the storage unit of the printer 102. The printer 102 includes "Image Print (receiving side)" and "Image Transfer (receiving side) as executable services.

Applications for performing "Image Print (receiving side)" are receiving application 1 and receiving application 2, and they can deal with a photo size and A4 size as the image sizes, which are stored as setting information in the storage unit of the printer 102.

In step S804, the notification unit 213 notifies service information of the digital camera 101 to the printer 102 via the communication unit 203. The notification unit 213 notifies service information illustrated in FIG. 7A to the printer 102. On receiving the notification, the printer 102 stores the service information of the digital camera 101 on the storage unit of the printer 102.

In step S805, referring to the service information of the printer 102 obtained in step S503, the extraction unit 207 extracts cooperative services executable between the digital camera 101 and the printer 102 out of services executable by the digital camera 101. The service information of the printer 102 and executable services of the digital camera 101 are stored in the storage unit 202.

Referring to service information of the printer 102, the extraction unit 207 further extracts applications to execute cooperative service from among applications included in the digital camera 101 and setting information that can be used in the applications.

In step S806, the calculation unit 208 calculates priority levels of the cooperative services selected in step S805, applications, and setting information, respectively.

The calculation unit 208 calculates priority levels for services by summing the priority levels respectively assigned to the cooperative services, applications, and setting information in the digital camera 101, and the priority levels respectively assigned to the similar items in the printer 102.

The cooperative service information illustrated in FIG. 7C is generated in steps S805 and S806, and stored in the storage unit 202.

In step S807, the display unit 204 displays the cooperative services that can be executed between the digital camera 101 and the printer 102. When displayed, the user, from the operation unit 205, can select a cooperative service executable between the digital camera 101 and the printer 102.

After selecting a cooperative service via the operation unit 205, the user can select applications to execute the selected cooperative service. After selecting applications via the operation unit 205, the user can perform settings of the selected applications based on setting information illustrated in FIG. 7C.

If there is one type of cooperative service that can be executed between the digital camera 101 and the printer 102, the user can omit the selection step of the cooperative service, and can select applications.

If there is one type of cooperative service and one type of application that can deal with the cooperative service, the user can omit selection of the cooperative service and the application, and can perform settings for the application.

In step S808, the timer unit 209 starts the timer to determine that the user has selected a cooperative service within a predetermined time period. In step S809, the timer unit 209 confirms whether the timer started in step S808 has timed out If the timer has timed out (YES in step S809), the processing proceeds to step S819. If the timer has not timed out (NO in step S809), the processing proceeds to step S810.

In step S810, the communication unit 203 determines whether the communication with the printer 102 has been disconnected. If the communication is not disconnected (continues) (NO in step S810), the processing proceeds to step S811.

In step S811, the confirmation unit 211 confirms whether a cooperative service has been selected by the user via the operation unit 205. If the cooperative service has not been selected by the user (NO in step S811), the processing proceeds to step S809. On the other hand, if the cooperative service has been selected (YES in S811), the processing proceeds to step S812.

The confirmation unit 211 may confirm whether the user has selected applications to execute the cooperative service and even information about settings. In step S812, the timer unit 209 stops the time that has started in step S808, and the processing proceeds to step S818.

On the other hand, in step S810, if the communication unit 203 determines that the communication with the printer 102 has been disconnected (YES in step S810), the processing proceeds to step S813. In step S813, the timer unit 209 stops the timer that has started in step S808, and the processing proceeds to step S814.

In step 814, the timer unit 209 starts the timer to measure time elapsed since the communication with the printer 102 has been disconnected. In step S815, the timer unit 209 confirms whether the timer started in step S814 has timed out. If the timer has timed out (YES in step S815), the processing is terminated. If the timer has not timed out (NO in step S815), the processing proceeds to step S816.

In step S816, the determination unit 210 determines whether the digital camera 101 has been again connected to the same printer 102. If the determination unit 210 determines that the digital camera 101 has been again connected to the same printer 102 (YES in step S816), the processing proceeds to step S817. If the digital camera 101 is not connected again to the same printer 102 (NO in step S816), the processing proceeds to step S815.

In step S817, the confirmation unit 211 confirms whether a cooperative service has been selected by the user while the communication is being disconnected. If the cooperative service has been selected by the user (YES in step S817), the processing proceeds to step S818. If cooperative service has not been selected (NO in step S817), the processing proceeds to step S819.

In step S818, the notification unit 213 notifies information about the cooperative service selected by the user via the communication unit 203 to the printer 102. Then, the processing proceeds to step S820.

In step S819, through the communication unit 203, the notification unit 213 notifies the printer 102 of "empty" cooperative service information, which represents that there is no cooperative service selected by the user.

In step S820, the decision unit 215 decides whether the digital camera 101 has received information about the cooperative service selected in the printer 102, within a predetermined time period since the communication with the printer 102 has been established in step S801.

If the digital camera 101 has received the cooperative service information (YES in step S820), the processing proceeds to step S824. If the digital camera 101 has not received the cooperative service information (NO in step S820), the processing proceeds to step S821. Even if the digital camera 101 has received "empty" cooperative service information from the printer 102, the processing proceeds to step S824.

In step S821, the confirmation unit 211 confirms whether a cooperative service has been selected by the user in one's own apparatus (digital camera). If the cooperative service has been selected by the user (YES in step S821), the processing proceeds to step S823. If the cooperative service has not been selected by the user (NO in step S821), the processing proceeds to step S822.

In other words, if the confirmation unit 211 has confirmed that the cooperative service has been selected in step S811 (YES in step S811), or if the confirmation unit 211 has confirmed that cooperative service has been selected in step S817 (YES in step S817), the processing proceeds to step S823.

If the confirmation unit 211 has confirmed that the cooperative service has not been selected by the user both in steps S811 and S817 (NO in steps S811 and S817), the processing proceeds to S822.

In step S822, the CPU 201 executes the cooperative service based on its priority level by using applications based on their priority levels. The cooperative service "Image Print (sending side)" is executed by executing "transmission application 1" with the highest priority level. An image is printed in photo size with reference to the priority level in setting information.

On the other hand, in step S823, the CPU 201 executes the cooperative service selected by the user. If the user has selected an application, the cooperative service is executed by using the application selected by the user. If the user has not selected an application, an application (transmission application 1) based on an order of priority levels is executed.

If the user has selected an application but has not performed settings according to the setting information for the application, the application is executed with settings selected according to the order of priority levels.

In step S824, the confirmation unit 211 confirms whether a cooperative service has been selected by the user at the digital camera 101 and also confirms whether "non-empty" cooperative service has been notified from the printer 102. In the present exemplary embodiment, that a "cooperative service has been selected by the user at the digital camera 101" means that the confirmation unit 211 has confirmed that the cooperative service has been selected in step S811 or S817 (YES in step S811 or S817).

As a result of confirmation, if it is determined that either "selection at the digital camera 101" or "notification of non-empty cooperative service information from the printer 102" has been performed (YES in step S811 or S817), the processing proceeds to step S823.

If neither "selection at the digital camera 101" nor "notification of non-empty cooperative service information has not performed (NO in step S811 or S817), the processing proceeds to step S822.

If both "selection at the digital camera 101" and "notification of non-empty cooperation service information from the printer 102" have been performed (YES in steps S811 and S817), the processing proceeds to step S825.

In step S825, the decision unit 215 decides whether the cooperative service selected at the digital camera 101 coincides with the cooperative service notified from the printer 102. If the two cooperative services coincide with each other (YES in step S825), the processing proceeds to step S823, or if the two cooperative services do not coincide (NO in step S825), the processing proceeds to step S826

In step S823, the display unit 204 notifies the user of an error, and terminates the processing, by which cooperative services that the user does not intend to use is prevented from being executed.

In the present exemplary embodiment, the cooperative service can be selected by using the digital camera 101 and the printer 102 equally. Therefore, the user can select a cooperative service by using the device that the user can operate more easily.

Even if the user has mistakenly selected different cooperative services with the digital camera 101 and the printer 102, an error notice is issued and the cooperative services are not executed. Therefore, unintended cooperative services are prevented from being executed.

The present invention can be executed as follows. A computer-readable recording medium that stores software program code to execute the functions in the above-described exemplary embodiments is supplied to a system or apparatus.

The system or apparatus reads the program code stored in the recording medium, and executes the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-235085 filed Oct. 9, 2009, which is hereby incorporated by reference herein in its entirety.

What is claimed is:

1. A communication apparatus comprising:
   a confirmation unit configured to confirm whether a process, which is to be executed between the communication apparatus and a partner communication apparatus in communication therewith, has been selected by a user;
   an extraction unit configured to extract priority information assigned to each of a plurality of processes performed by the communication apparatus and priority information assigned to each of a plurality of processes performed by the partner communication apparatus;
   a determination unit configured to determine a process to be executed when a process has not been selected by the user, wherein the determination is according to the priority information assigned to each of a plurality of processes; and
   an execution unit configured to execute the process determined by the determination unit or the process confirmed by the confirmation unit when the communication apparatus is connected to the partner communication apparatus,
   wherein the execution unit executes the process which has been selected by the user when the confirmation unit confirms that there is a process selected by the user when the communication is connected, and
   wherein the execution unit executes the process determined by the determination unit when the confirmation unit does not confirm that there is a process selected by the user when the communication is connected.

2. The communication apparatus according to claim 1, further comprising:
   an acquisition unit configured to acquire function information of the partner communication apparatus from the partner communication apparatus; and
   a setting unit configured to set the priority for each of the plurality of processes according to the function information acquired from the acquisition unit.

3. The communication apparatus according to claim 1, wherein the determination unit determines a process to be executed according to a priority assigned to function information of the communication apparatus and a priority assigned to function information of the partner communication apparatus.

4. The communication apparatus according to claim 1, wherein the execution unit executes the process according to a time period between when the communication with the partner communication apparatus is disconnected and when the communication is established again.

5. The communication apparatus according to claim 1, wherein the execution unit transmits data to be processed by the partner communication apparatus to the partner communication apparatus.

6. The communication apparatus according to claim 1, further comprising a decision unit configured to decide, based on an identifier to identify the partner communication apparatus, that the communication apparatus has been connected to the partner communication apparatus.

7. The communication apparatus according to claim 1, further comprising an operation unit to allow the user to select a process.

8. The communication apparatus according to claim 1, wherein the execution unit executes the process determined by the determination unit according to the process executable by the communication apparatus and the partner communication apparatus without allowing the user to select a process.

9. The communication apparatus according to claim 1, further comprising a setting unit configured to raise the priority of the selected process higher than other processes when the process is selected by the user.

10. The communication apparatus according to claim 1, further comprising a notification unit configured to notify the user of an error when the process determined by the determination unit differs from the selected process.

11. The communication apparatus according to claim 1, wherein the confirmation unit confirms whether a process has been selected by the user by using the communication apparatus.

12. The communication apparatus according to claim 1, wherein the confirmation unit confirms whether a process has been selected by the user by using the partner communication apparatus.

13. The communication apparatus according to claim 1, further comprising a calculation unit configured to calculate a priority of a process based on the priority information assigned to the process performed by the communication apparatus and the priority information assigned to the process performed by the partner communication apparatus.

14. The communication apparatus according to claim 13, wherein the calculation unit calculates the priority of the process by adding the priority information assigned to the process performed by the communication apparatus and the priority information assigned to the process performed by the partner communication apparatus.

15. The communication apparatus according to claim 13, wherein the calculation unit calculates the priority of the process by multiplying the priority information assigned to the process performed by the communication apparatus and the priority information assigned to the process performed by the partner communication apparatus.

16. A non-transitory computer-readable storage medium storing computer-executable instructions thereon, which when executed by a computer, cause the computer to perform operations comprising:
   confirming whether a process executable between a communication apparatus and a partner communication apparatus has been selected by a user;
   extracting priority information assigned to each of a plurality of processes performed by the communication apparatus and priority information assigned to each of a plurality of processes performed by the partner communication apparatus;
   determining a process to be executed when a process has not been selected by the user, wherein the determination is made according to the priority information assigned to each of a plurality of processes; and
   executing the determined process or the confirmed process when the communication apparatus is connected to the partner communication apparatus,
   wherein the process which has been selected by the user is executed when it is confirmed that there is a process selected by the user when the communication is connected, and wherein the process which has been determined is executed when it is not confirmed that there is a process selected by the user when the communication is connected.

17. A control method of a communication apparatus, comprising:
confirming whether a process to be executed between the communication apparatus and a partner communication apparatus in communication therewith has been selected by a user;
extracting priority information assigned to each of a plurality of processes performed by the communication apparatus and priority information assigned to each of a plurality of processes performed by the partner communication apparatus;
determining a process to be executed when a process has not been selected by the user, wherein the determination is made according to the priority information assigned to each of a plurality of processes; and
executing the determined process or the confirmed process when the communication apparatus is connected to the partner communication apparatus,
wherein the process which has been selected by the user is executed when it is confirmed that there is a process selected by the user when the communication is connected, and
wherein the process which has been determined is executed when it is not confirmed that there is a process selected by the user when the communication is connected.

18. The control method according to claim 17, further comprising:
acquiring function information of the partner communication apparatus from the partner communication apparatus; and
setting the priority for each of the plurality of processes according to the acquired function information.

19. The control method according to claim 17, wherein a process to be executed is determined according to a priority assigned to function information of the communication apparatus and a priority assigned to function information of the partner communication apparatus.

20. The control method according to claim 17, wherein the process is executed according to a time period between when the communication with the partner communication apparatus is disconnected and when the communication is established again.

21. The control method according to claim 17, wherein the executing the determined process is according to the process executable by the communication apparatus and the partner communication apparatus without allowing the user to select a process.

22. The control method according to claim 17, further comprising raising the priority of the selected process higher than other processes when the process is selected by the user.

23. The control method according to claim 17, further comprising notifying the user of an error when the determined process differs from a process selected by a user at the partner communication apparatus.

24. A communication apparatus comprising:
a wireless communication unit configured to perform first communication to receive information about another communication apparatus from the another communication apparatus and second communication with the another communication apparatus to execute predetermined processing;
a display unit configured to display a screen to select processing to be executed by the communication apparatus according to the first communication; and
a communication control unit configured to control the wireless communication unit so that the wireless communication unit performs the second communication to execute the predetermined processing in a case where the communication apparatus is connected to the another communication apparatus via the wireless communication unit, with processing being selected by a user based on the screen, after the first communication has been executed and before a predetermined time has elapsed since communication with the another communication apparatus via the wireless communication unit is disconnected, and so that the wireless communication unit performs the first communication again in a case where the communication apparatus is connected to the another communication apparatus via the wireless communication unit after the first communication has been executed and after a predetermined time has elapsed since communication with the another communication apparatus via the wireless communication unit is disconnected.

25. The communication apparatus according to claim 24, wherein, in a case where there is processing selected by a user during a period after the communication with the another communication apparatus via the wireless communication unit is disconnected and before the communication with the another communication apparatus via the wireless communication is reconnected, the second communication to execute the selected processing is performed.

26. The communication apparatus according to claim 24, wherein the second communication is executed to transmit data to be processed by the another communication apparatus to the another communication apparatus.

27. The communication apparatus according to claim 24, wherein the communication control unit is configured to control the wireless communication unit so that the wireless communication unit receives the information about the another communication apparatus from the another communication apparatus, without performing the second communication, in a case where the communication apparatus is connected to yet another communication apparatus different from the another communicator apparatus via the wireless communication unit after an identifier of the another communication apparatus is received from the another communication apparatus in the first communication and before the predetermined time has elapsed since the communication with the another communication apparatus via the wireless communication unit is disconnected.

28. The communication apparatus according to claim 24, wherein the information about the another communication apparatus is information about an application to execute a function to be provided by the another communication apparatus.

29. The communication apparatus according to claim 24, wherein the predetermined processing includes print processing or image transfer processing.

* * * * *